Sept. 20, 1949. U. H. KRABBE Re. 23,148

MEANS FOR REGULATING A MACHINE VOLTAGE

Original Filed Sept. 28, 1943

Inventor
Ulrik Hindenburg Krabbe
By [signature] Attorney

Reissued Sept. 20, 1949 Re. 23,148

UNITED STATES PATENT OFFICE 23,148

MEANS FOR REGULATING A MACHINE VOLTAGE

Ulrik Hindenburg Krabbe, Fr. Boge, Denmark, assignor to Allmänna Svenska Elektriska Aktiebolaget, Vasteras, Sweden, a Swedish corporation Original No. 2,429,724, dated October 28, 1947, Serial No. 504,131, September 28, 1943. Application for reissue October 26, 1948, Serial No. 56,621. In Sweden September 28, 1942.

5 Claims. (Cl. 322—24)

Figure 1:
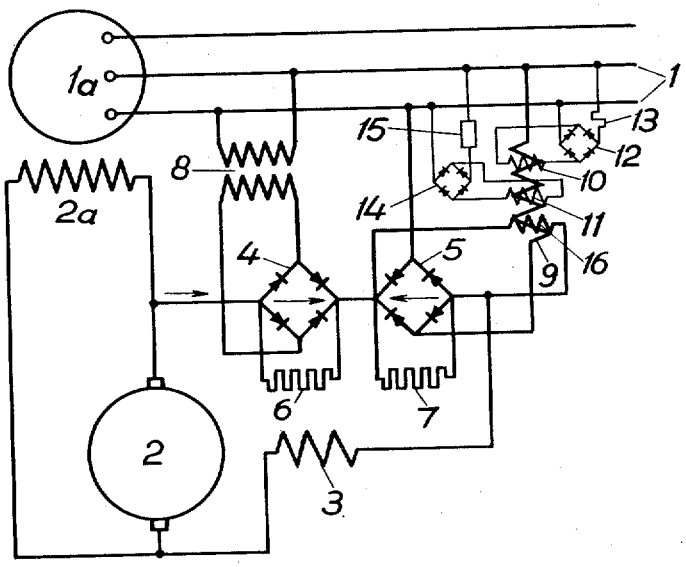

For regulating the voltage of an electric machine, i. e. an alternating current generator, it is known to employ an exciter the excitation of which is influenced by a direct current saturable reactor. The known arrangements of this kind have, however, either been unnecessarily complicated or have had rather weak regulating properties, as a slow regulation or an incapacity of keeping up the voltage at strong load impulses.

One object of the present invention is to provide a regulator with an exciter influenced by a direct current saturable reactor, which first can be made independent of any external voltage source, and therefore is especially suited for small installations which operate independently, which further is simple and finally has good regulating properties, i. e., a capacity of rapid regulation and of keeping up the voltage also at strong load impulses. The characteristic feature of the invention is, first, that the excitation of the exciter comprises one component which is derived from its own voltage, and another component counteracting the former and derived from the voltage of the main machine, this latter component comprising at least one subcomponent controlled by a direct current saturable reactor, the direct current magnetisation of which depends on the difference between a quantity derived from the voltage to be regulated and a standard quantity. The deriving of the counteracting excitation from the voltage of the main machine has the advantage, that any voltage variation of the main machine during the first instant contributes to a variation of the excitation of the exciter in such direction as to counteract the voltage variation. At the same time the fact that the excitation of the exciter is partly (and normally to the greater part) derived from the exciter itself or from an independent voltage, affords a guarantee that the exciter voltage cannot collapse even with the most heavy load impulses on the main machine, and that the exciter can always take up voltage without being dependent on the voltage of the main machine.

By deriving one component of the excitation derived from the voltage of the main machine through a direct current saturable reactor, the direct current magnetisation of which depends on the difference between a quantity derived from the voltage to be regulated and a standard quantity, an accurate regulation is made possible with a small power of the standard quantity, since it is possible to introduce a considerable amplification by means of the direct current saturable reactor.

A more particular object of the invention is the provision of a regulator in which a magnetizing component is so derived from the comparison direct current saturable reactor as to be counteracting, in which case the unavoidable inertia of the said direct current saturable reactor acts in a favorable direction during a regulation procedure. The influence of the magnetic inertia of the direct current saturable reactor may for instance be understood in such a way that the voltage drop therein cannot be instantaneously altered when the resultant direct current ampere turns are altered. If then, for instance, the voltage of the main machine drops heavily at a load impulse, the direct current saturable reactor will during the first instant consume a larger proportion of the voltage than before, possibly practically the whole voltage, so that the counter-excitation controlled thereby will be strongly reduced, possibly down to zero. The voltage acting on the total excitation will therefore rise instantaneously even if it takes a measurable time for the direct current saturable reactor to adjust itself to the new current value, which is needed for keeping up the voltage in the continuation. The conditions of regulation upon a sudden relief of load with a voltage rise caused thereby are analogous to those just described for a sudden increase of load, as such voltage rise at the first instant acts unreduced on the counter-excitation and thus initiates the lowering of the voltage.

Still another object is the provision of a direct current saturable reactor for controlling the operation of a machine, such as an alternating current generator wherein a positive excitation is derived from the voltage of the main machine on the exciter for the production of stabilisation. This is especially desirable when the counter-excitation acts through the same winding as the self-excitation.

Figure 2:
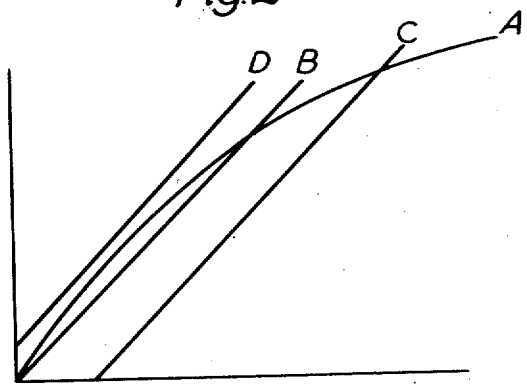

A form of the invention arranged in the last-mentioned way is diagrammatically illustrated in Fig. 1, while Fig. 2 shows a diagram of the manner of operation.

1 designates a pair of busbars fed by an alternating current generator 1*a* magnetized by a winding 2*a* fed by the exciter 2. The generator illustrated is threephase, although only the busbars for two poles may now be considered for purposes of describing the invention. The exciter 2 has an exciting winding 3, which is fed from its own terminals in series with a pair of rectifiers 4, 5, to which resistances 6, 7 are connected in parallel. The rectifier 4 with the parallel resistance 6 is directly connected to the busbars 1 through a transformer 8 and is so connected as to introduce into the exciting circuit a voltage, which is added to the armature voltage of the exciter 2. The rectifier 5 with the parallel resistance 7 is so connectid as to counteract the excitation and is fed from the busbars 1 through a comparison device comprising a direct current saturable reactor 9, the direct current magnetisation of which depends on the difference between a quantity derived from the voltage to be regulated, i. e., the voltage on the busbars, and a comparison or standard quantity. If desired both of the quantities compared with each other may be derived from the regulated quantity through circuits of different characteristics, for instance one of them directly and the other through a constant current member. At any rate, the character of the circuits should be such that the two quantities compared balance each other only for a predetermined value of the voltage. The drawing shows two direct current windings 10, 11 on the direct current saturable reactor 9 balancing each other, one of these windings 10 being directly connected to the busbars 1 through a rectifier 12 and an ohmic resistance 13, while the other 11 is connected to the bars 1 through a rectifier 14 and a constant current member 15, which is only diagrammatically indicated. A constant standard number of ampere turns on the direct current saturable reactor may be proposed by two windings counteracting each other. The direct current saturable reactor finally has, in a manner well known per se, a self-fed winding 16, which reinforces its action.

The manner of operation of the arrangement now described can be substantially seen from Fig. 2. In this figure, A is the excitation curve of the exciter and B its resistance line without respect to the additional voltages in the exciting circuit depending on the rectifiers 4, 5. The action of the last-mentioned ones will of course be different under stationary conditions and during the dynamical transient conditions, since both these voltages are depending on the voltage to be regulated. If the latter is provisionally regarded as constant, the sum of the self-excitation and the additional excitation from the rectifier 4 may be represented by the line C in Fig. 2. The maximum value of the counter-excitation introduced by the rectifier 5 may be represented by the horizontal distance between the lines C and D, whence the total excitation at maximum counter-excitation is represented by the line D. The minimum value of the counter-excitation may be assumed to be zero.

During a regulating procedure, the excitation of the exciter has therefore the possibility of oscillating between the values represented by the lines C and D, and the distance between these lines and the excitation curve A defines the speed of regulation at a regulation upwards and downwards, respectively. It is to be preferred that these lines are at such a distance from the excitation curve that the speed of regulation at all points of the excitation curve will be about the same independently of the curvature of the curve. To such a constancy the dynamic properties of the regulator contribute to a certain extent. Upon a lowering of the voltage with a subsequent upward regulation, the positive excitation by the rectifier 4 is at the first instant lowered, corresponding to a bend of the line C in the same sense as the curve A. At an increase of voltage with a subsequent regulation downwards, on the other hand, the counter-excitation by the rectifier 5 is increased to a higher degree than the positive excitation by the rectifier 4, which corresponds to a bending of the line D in the same sense as the curve A.

Between the comparison direct current saturable reactor 9 and the rectifier 5, there may of course be introduced one or more magnetic amplifiers consisting of direct current saturable reactors. The regulator may of course be provided with a feedback, for instance in the form of a winding on the comparison direct current saturable reactor or on the constant current member, which may be influenced by the exciter voltage through an impulse or "stabilizing" transformer or by a winding on an intermediate direct current saturable reactor.

I claim:

1. In a voltage regulating system comprising a main electrical machine, an exciter therefor, and a direct current saturable reactor, means to feed to said reactor the voltage of the main machine, exciting means for said exciter comprising means for producing a first component derived from the voltage of said exciter and means for producing at least partly through the reactor another component counteracting the first component and positively controlled by said reactor, and direct current magnetization means for said reactor responsive to the difference between a standard voltage and the voltage of the main machine.

2. In a voltage regulating system comprising a main electrical machine, an exciter therefor, and a direct current saturable reactor, means to feed to said reactor the voltage of the main machine, exciting means for said exciter comprising means for producing a first component derived from the voltage of said exciter and means for producing another component counteracting the first component and varying in the same sense with the voltage fed to said reactor, and direct current magnetization means for said reactor responsive to the difference between a standard voltage and the voltage of the main machine.

3. In a voltage regulating system comprising a main electrical machine, an exciter therefor, and a direct current saturable reactor, exciting means for said exciter comprising means for producing a first component derived from the voltage of said exciter and means for producing another component counteracting the first component and derived from the voltage of the main machine, at least partly through said reactor, and direct current magnetization means for said reactor responsive to the difference between a standard voltage and the voltage of the main machine.

4. In a voltage regulating system comprising a main electrical machine, an exciter therefor, and a direct current saturable reactor, exciting means for said exciter comprising means for producing a first component derived from the voltage of said exciter, and means for producing another component derived from the voltage of said main machine at least partly through said reactor and counteracting said first component, and direct current magnetization means for said reactor comprising variable impedance means for producing a standard quantity derived from the voltage of said main machine and means for producing a quantity derived from and varying with the voltage of said main machine, said magnetization depending on the difference between the two named quantities.

5. In a voltage regulating system as in claim 1, a winding for said exciter, and said means for producing said components further including respectively a rectifier connected in series with said winding, and a resistance connected in parallel between the direct current terminals of its respective rectifier.

ULRIK HINDENBURG KRABBE.

REFERENCES CITED

The following references are of record in the file of this patent:

UNITED STATES PATENTS

| Number | Name | Date |
|---|---|---|
| 1,710,755 | West | Apr. 30, 1929 |